United States Patent [19]

Denizou

[11] Patent Number: 5,183,626
[45] Date of Patent: Feb. 2, 1993

[54] CONTROL CLUSTER INCLUDING DEMOUNTABLE FUEL FOR A NUCLEAR FUEL ASSEMBLY

[75] Inventor: Jean-Pierre Denizou, Craponne, France

[73] Assignees: Framatome, Courbevoie; Cogema, Velizy Villacoublay, both of France

[21] Appl. No.: 372,494

[22] Filed: Jun. 28, 1989

[30] Foreign Application Priority Data

Jun. 28, 1988 [FR] France ............................. 88 08674

[51] Int. Cl.$^5$ ............................................. G21C 7/10
[52] U.S. Cl. ..................................... 376/327; 376/233; 376/446
[58] Field of Search ............... 376/327, 233, 224, 225, 376/446, 451; 976/DIG. 119, DIG. 124, DIG. 122, DIG. 46, DIG. 68, DIG. 59, DIG. 48, DIG. 39

[56] References Cited

U.S. PATENT DOCUMENTS

| | | | |
|---|---|---|---|
| 3,330,736 | 7/1967 | Cousseran et al. | 976/DIG. 59 |
| 4,189,348 | 2/1980 | Donck et al. | 376/451 |
| 4,418,462 | 12/1983 | Walton | 976/DIG. 124 |
| 4,711,756 | 12/1987 | Nakazato | 376/327 |
| 4,770,846 | 9/1988 | Land et al. | 976/DIG. 68 |
| 4,820,475 | 4/1989 | Mayers et al. | 376/327 |
| 4,820,479 | 4/1989 | Hornak et al. | 376/446 |
| 4,855,100 | 8/1989 | Shallenberger et al. | 376/327 |
| 4,928,291 | 5/1990 | Mouesca et al. | 376/327 |
| 4,993,864 | 2/1991 | Gjertsen et al. | 376/327 |

FOREIGN PATENT DOCUMENTS

| | | |
|---|---|---|
| 0159509 | 10/1985 | European Pat. Off. . |
| 0169421 | 1/1986 | European Pat. Off. . |
| 0249544 | 12/1987 | European Pat. Off. . |
| 2077483 | 12/1981 | United Kingdom . |

Primary Examiner—Harvey E. Behrend
Attorney, Agent, or Firm—Pollock, Vande Sande & Priddy

[57] ABSTRACT

For each of the demountable fuel rods (23), the end part of the protective tube (27), which end part is open towards the exterior, has a reduced diameter over a certain length and comprises at least one seating which does or does not pass through its wall. The end part of the fuel rod (23) is integral with a ferrule (34) which is coaxial with the fuel rod and which surrounds the assembly rod (31) of the fuel rod over part of its length. The ferrule (34) is engaged on the reduced-diameter part of the protective tube (27) when the rod (31) is screwed into the bore (28) of the protective tube. Locking against rotation of the fuel rod in the protective tube (27) is ensured by deformation of the ferrule (34) within the openings of the end part of the protective tube (27). The fuel rod is demounted by exerting a torque on it by way of an engagement surface (37), for example of prismatic form, located near the end of the fuel rod.

4 Claims, 3 Drawing Sheets

CONTROL CLUSTER INCLUDING DEMOUNTABLE FUEL FOR A NUCLEAR FUEL ASSEMBLY

FIELD OF THE INVENTION

The invention relates to a control cluster including demountable fuel rods having an active portion which may be introduced into the guide tubes of a fuel assembly of a nuclear reactor.

BACKGROUND OF THE INVENTION

The core of light-water-cooled nuclear reactors, and especially of nuclear reactors cooled by pressurized water, consists of assemblies of prismatic form which are juxtaposed and constituted in the form of bundles of fuel rods between which there are placed, in specified positions, guide tubes in which, when the reactor is in service, means for regulating the nuclear reaction are displaced. The fuel rods and the guide tubes are in vertical position in the core of the reactor.

Use is made of clusters comprising a plurality of parallel fuel rods which constitute the means for regulating the nuclear reaction, when they are introduced more or less deeply into the guide tubes.

Each of the control clusters used for operating the reactor is associated with a fuel assembly, the fuel rods of such cluster being disposed in an array corresponding to the guide tubes of the assembly. The guide clusters comprise a crosspiece or spider comprising a plurality of fins distributed angularly about the axis of the cluster and a central sleeve which permits the connection of the cluster to an operating rod or extension piece permitting the displacement of the cluster in the core. Each of the fins of the spider comprises at least one protective tube having a bore enabling attachment of a fuel rod on the spider. The fuel rods comprise an active part closed at its ends by plugs and extended on one side by a rod which comes into engagement in the bore of the protective tube, of longitudinal direction, to ensure the fixing of the fuel rod on the cluster.

The control clusters of the reactor have well defined functions, depending on the nature of the fuel rods constituting these clusters.

Certain clusters permit the regulation of the reactivity throughout the operation of the reactor, and especially the variation of its power. Other clusters contain a consumable poison and are introduced into the core exclusively during the first cycle of core operation in other clusters, the fuel rods simply constitute plugs intended to obturate the guide tubes of the assemblies in order to limit the throughput of coolant circulating in the assembly without coming into contact with the fuel rods; finally, other clusters permit the performance of a variation of the neutron spectrum of the core by modification of the moderator volume in the core.

It is clearly advantageous to construct the means for fixing the end part of the fuel rods on the spider in such a manner that these fuel rods remain demountable in case of excessive wear, of fracture or deterioration. This obviates the need to undertake complete replacement of the cluster. However, the elements for fixing the fuel rods on the spider must exhibit a high degree of safety in service and prevent any accidental separation the fuel rod and of the spider, for example under the effect of the vibrations in the core of the reactor.

Devices and processes have therefore been proposed for the demountable fixing of fuel rods on control clusters which theoretically diminish the risks of accidental separation of the fuel rod and the spider in service.

FR-A-2,439,457 discloses a process for positioning and withdrawal of fuel rods from a control cluster and the corresponding fixing device. The plug obturating the end part of the fuel rod to be assembled to the spider is extended by a deformable ferrule, the diametral expansion of which is carried out within the bore of the protective tube of the spider in order to ensure the fixing of the fuel rod.

The fuel rod may be demounted by exerting a force of longitudinal direction on the plug, in such a manner as to restrict the ferrule and to permit passage thereof into the bore of the protective tube.

In order to undertake the fixing and demounting of the fuel rod, the plug and the ferrule which extends it must be accessible by the end of the protective tube opposite to the end by which the fuel rod is engaged. The protective tubes of the spider must therefore pass through the fins from side to side; this presents disadvantages and corresponds to a particular type of spider.

Furthermore, in the course of the positioning or withdrawal of a fuel rod, forced support is taken on the bore of the corresponding protective tube. These operations may involve deformations of the bore, so that it is necessary to refinish or remachine the spider, or less frequently, in the case where a large number of replacements of fuel rods are undertaken. These refinishing or remachining operations are relatively complex, to the extent that the cluster has been activated under the effect of the bombardment of the neutrons while it has remained in the core of the nuclear reactor.

On the other hand, deformation of the metal constituting the ferrule at the end of the fuel rod results in the creation of a certain fragility, to the extent that the forces applied in the course of the deformation are not always easily controllable. This creation of fragility, may lead to an accidental separation of the fuel rod and the spider, under the effect of the vibrations to which the fuel rod is subjected in the reactor in service.

Moreover, the demounting of the fuel rod necessitates the exertion of a large force in the longitudinal direction on the plug in order to push the end part of the fuel rod through the bore. In the case of the appearance of jamming or of a hard point, relatively large jolts may take place, in the course of the demounting of the fuel rod, which run the risk of causing the appearance of fractures or of other deteriorations of the fuel rod which has been made particularly fragile by the irradiation.

FR-A-2,599,884 contains the proposal of another mode of fixing of the fuel rods, likewise requiring the presence of protective tubes, the bores of which pass through the fins of the spider from side to side.

The fixing rod extending the fuel rod is of a sufficient length for its end part to project in relation to the upper end of the protective tube, when the fuel rod is engaged, in the assembly position, into this protective tube. The projecting upper part of the rod comprises a thread on which there may be engaged an internally threaded hollow plug supported on the upper part of the protective tube and ensuring the fixing of the fuel rod, when it is screwed onto the threaded part of the rod. The fixing may be completed by making the assembly non-unscrewable under the effect of the vibrations, by virtue of deformable metallic elements integral with the rod, which elements may be turned down into cavities formed in the hollow plug.

This fixing device, while entirely satisfactory, is applicable only in the case of the spiders comprising protective tubes the bores of which pass from side to side through the fins in which they are placed.

A more common type of control clusters comprises a spider the protective tubes of which have blind bores threaded internally over a part of their length and through the opening of which there is introduced the assembly rod of a fuel rod which comprises a threaded part which is screwed into the internally threaded part of the protective tube. The assembly rod is made non-unscrewable under the effect of the vibrations, by introducing and welding a pin within a seating constructed at the end of screwing of the assembly rod of the fuel rod, by placing into alignment of an opening passing through the protective tube and a blind hole provided in a large-diameter part of the assembly rod constituting a centering ring.

This mode of locking the fuel rod against rotation is difficult and tricky to implement; this complicates the operations of replacement of a fuel rod on a control cluster.

SUMMARY OF THE INVENTION

The object of the invention is therefore to propose a control cluster including demountable fuel rods comprising a crosspiece or spider constituted by a plurality of fins disposed angularly in relation to one another and each comprising at least one protective tube having a bore which is blind and internally threaded over a part of its length, the axis of which corresponds to the longitudinal direction of the cluster, as well as a set of fuel rods each comprising a cylindrical active part and an end part intended to be engaged and fixed in the bore of a protective tube of the spider and comprising, in the axial extension of a plug for closing the active part, a rod which is threaded over a part of its length, ensuring the screwing of the rod into the bore of the corresponding protective tube, this control cluster permitting simplification of the replacement of a fuel rod, while ensuring very reliable fixing and very good resistance to forces suffered by the control cluster in the reactor in service.

To this end, for each of the demountable fuel rods:
the end part of the protective tube, which end part is open towards the exterior, has a reduced external diameter over a certain length and comprises at least one seating on its wall,
the end part of the fuel rod is integral with a ferrule which is coaxial with the fuel rod and which surrounds the rod over a part of its length corresponding to the part of the rod engaged in the reduced-diameter part of the protective tube, the ferrule having an internal diameter substantially equal to the reduced diameter of the protective tube,
an engagement surface is provided on the external surface of the fuel rod,
locking of the fuel rod against rotation in the protective tube being ensured by deformation of the ferrule within the openings of the end part of the protective tube and the demounting, by exerting a torque on the fuel rod by means of the prismatic surface, to push back the deformed parts of the ferrule.

BRIEF DESCRIPTION OF THE DRAWINGS

In order to provide a good understanding of the invention, a description will now be given, by way of example, with reference to the accompanying drawings of an embodiment of a control cluster including demountable fuel rods according to the invention which is intended for an assembly of a pressurized-water nuclear reactor.

DESCRIPTION OF PREFERRED EMBODIMENT

Figure 1A:
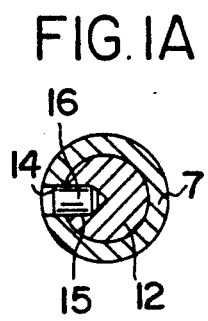
FIG. 1A is a view, in cross-section, along A—A of FIG. 1.
Figure 1:
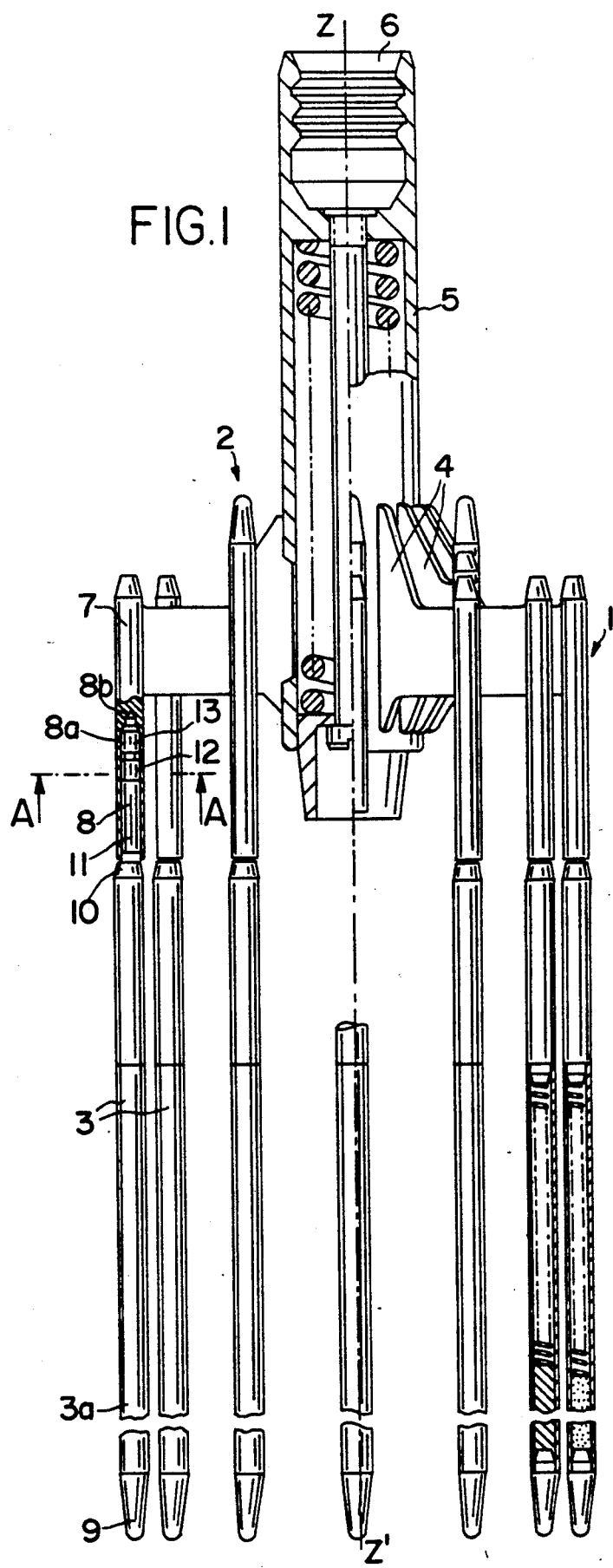
FIG. 1 is a front elevation view, partly in cross-section, of a control cluster according to the prior art.

FIG. 1 shows a control cluster 1, comprising a crosspiece or spider 2 and a bundle of parallel fuel rods 3 which may be, for example, absorbing fuel rods permitting the regulation of the power in an assembly of the core of the reactor.

The spider 2 comprises a plurality of fins 4 which are regularly distributed angularly about the longitudinal axis ZZ' of the cluster and integral with a sleeve 5 permitting the connection of the control cluster 1 to an operating rod. To this end, the sleeve 5 comprises at its upper part a bore 6, in which it is possible to engage and to fix the end of the operating rod of the cluster.

The end part of each of fins 4 which is opposite to the end of such fin connected to the sleeve 5 constitutes a protective tube 7, the internal bore 8 of which extends in the axial direction ZZ' of the cluster. The bore 8 is a blind bore which comprises a threaded part 8a just below the hole base 8b within the sleeve 7.

Each of fuel rod 3 comprises an active part 3a constituted by a tube filled with pellets of absorbent material and closed at its ends by plugs 9 and 10.

The end part of the fuel rod 3, above the upper plug 10, constitutes the assembly rod 11 of the fuel rod which is introduced into the bore 8 of the protective tube by its open lower end.

The rod 11 comprises a large-diameter part 12 constituting a ring for centering and for locking against rotation and a threaded part 13 which is screwed into the internally threaded part 8a of the bore 8 in the course of the mounting of the fuel rod 3. At the end of screwing, the plug 10 of the fuel rod is supported on the open end of the protective tube 7 and the end of the rod 11 in the hole base 8b.

Furthermore, as can be seen in FIG. 1A, at the end of screwing, an opening 14 passing through the wall of the protective tube 7 comes into alignment with a blind hole 15 machined in the centering ring 12 of the rod 11.

The opening 14 and the blind hole 15 constitute a seating for a pin 16 for locking the rod 11 and the fuel rod 3 against rotation relative to the protective tube 7 of the spider. The fixing of the fuel rod is completed by welding of the end of the pin 16 within the opening 14 of the protective tube.

These operations of assembly, locking and welding are relatively complex and necessitate perfect alignment of the corresponding parts of the rod 11 and of the protective tube 7.

Figure 2:
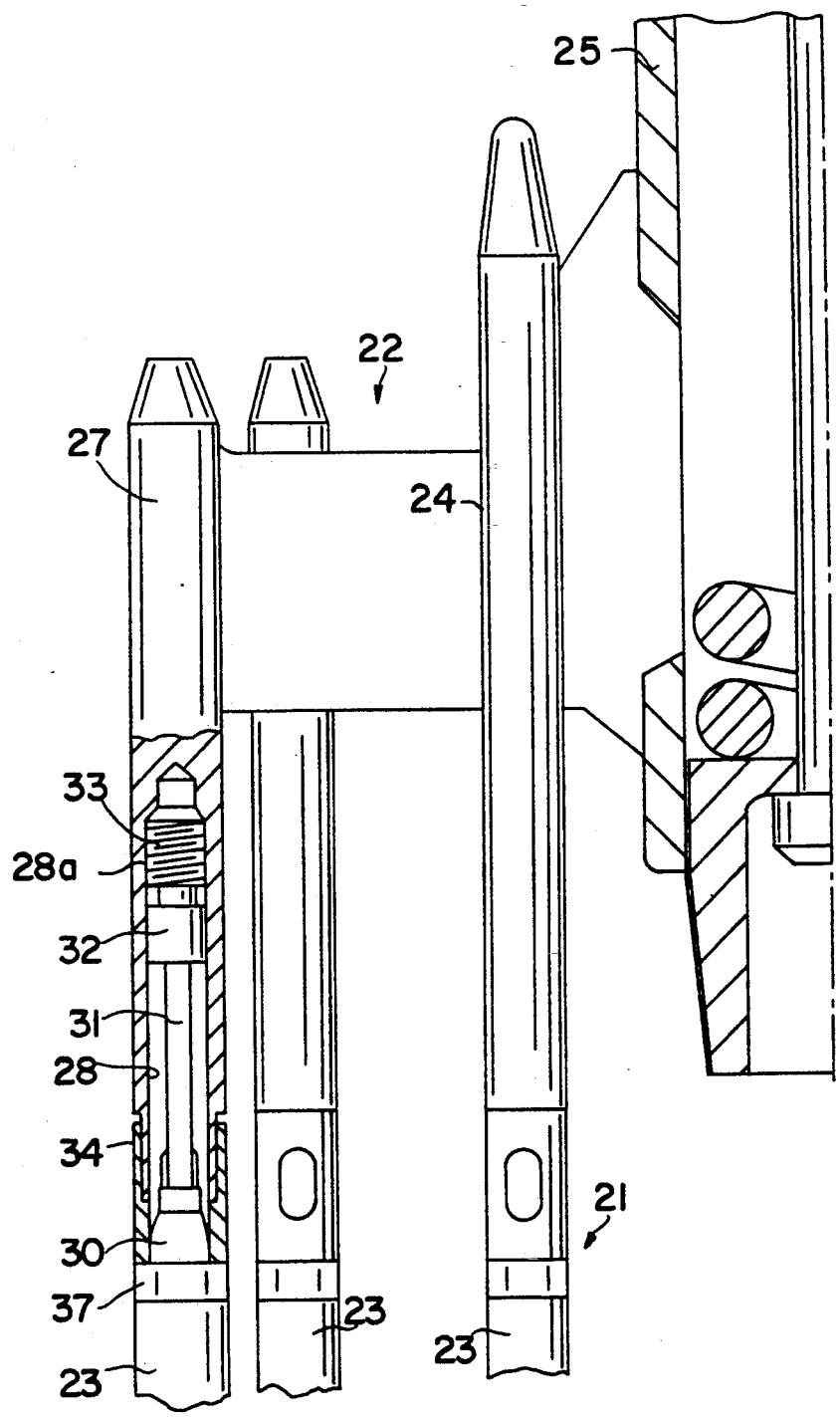
FIG. 2 is an elevation view, partly in cross-section, of a part of a control cluster according to the invention.

FIG. 2 shows a part of a control cluster according to the invention, designated generally by the reference 21.

The general structure of the cluster according to the invention shown in FIG. 2 is identical with the structure of the prior art cluster shown in FIG. 1. The cluster 21 comprises a spider 22, the fins 24 of which are fixed on a common sleeve 25. Each of the fins carries at its end a sleeve 27 comprising a bore 28 in which there is engaged the end part of a fuel rod 23, which end part is situated above the upper plug 30. This end part of the fuel rod 23 is constituted by a rod 31 ensuring the fixing of the fuel rod 23 on the spider 22.

The rod 31 comprises a large-diameter part 32 constituting a ring for centering the rod 31 in the bore 28. The rod 31 likewise comprises a threaded part 33 which is screwed onto an internally threaded part 28a of the bore 28 of the protective tube 27.

Figure 3:
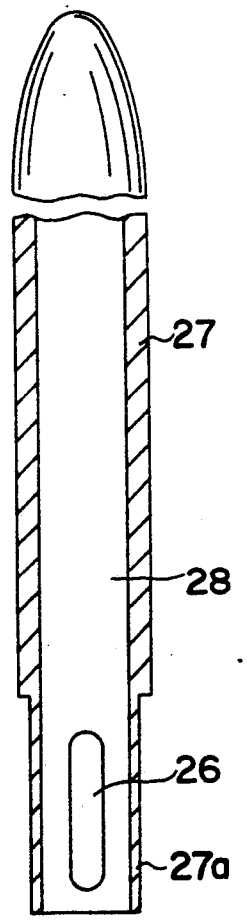
FIG. 3 is a view, elevation and in partial cross-section on a larger scale, of a protective tube of the control cluster shown in FIG. 2.

The protective tube 27 and the fuel rod 23 further comprise supplementary means for locking, in the fuel rod against rotation relative to the spider, which means will now be described with reference to FIGS. 3 and 4.

The protective tube 27 comprises an end part 27a of reduced external diameter, in the vicinity of the open end of the bore 28. Furthermore, in this part 27a, the protective tube comprises a set of oblong openings 26 passing through its wall.

Figure 4:
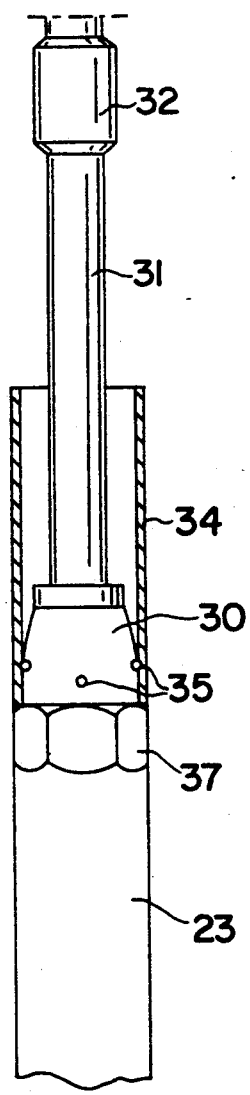
FIG. 4 is an elevation view, partly in cross-section, of the end part of a fuel rod of a control cluster according to the invention.

As shown in FIG. 4, the fuel rod 23 comprises an upper plug 30, the diameter of which is very slightly less than that of the active part of the fuel rod. On the reduced-diameter part of the ferrule 34 is fixed coaxially with ferrule 34 is fixed in a coaxial manner in relation to the fuel rod 23 and surrounds, over a certain height, the lower part of the assembly rod 31 of the fuel rod. The part of the rod 31 surrounded by the ferrule 34 corresponds to the part of this rod which comes within the part 27a of the protective tube 27 when the fuel rod is fixed on the spider, as shown in FIG. 2.

The fuel rod further comprises, at the lower part of the plug 30, an engagement surface 37, for example of prismatic form, permitting the placing of a tightening tool such as a key in engagement with the external surface of the fuel rod. When the ferrule 34 is welded onto the plug 30, this ferrule 34 ensures by its thickness a continuity of the external surface of the fuel rod.

The fuel rod 23 is mounted on the spider 22 as in the case of the device according to the prior art represented in FIG. 1, by introducing the upper part of the assembly rod 31 into the lower opening of the protective tube 27, then by displacing the fuel rod 23 in the axial direction until the threaded part 33 of the rod 31 comes into contact with the lower end of the internally threaded part 28a. There is then performed the screwing of the threaded part 33 is then screwed into the internally threaded part 28a by causing the fuel rod to rotate about its axis. At the end of screwing, the fuel rod 23 is located against rotation relative to the protective tube 27 by locally deforming the ferrule 34 in such a manner as to push back the wall of this ferrule within the passages 26. This operation is clearly far simpler than introducing and welding a pin in openings aligned with the protective tube and the assembly rod.

In order to demount a fuel rod 23 which to be replaced, the fin 24 of the spider carrying the sleeve 27 in which the fuel rod 23 is fixed is immobilized. Use is made of a key cooperating with the prismatic surface with a hexagonal base 37 to exert a torque on the fuel rod 23 capable of pushing back the deformed parts of the ferrule 34 and of causing them to pass out of the passages 26. The fuel rod is demounted by unscrewing the threaded part 33.

The control cluster according to the invention thus permits very reliable and effective fixing of the fuel rods by relatively simple operations utilizing reduced tooling. In particular, it is not necessary to have available welding or brazing tooling, provided that the fuel rod is locked against rotation exclusively by deformation of a ferrule.

On the other hand, demounting of the fuel rod is extremely easy, since it is sufficient to exert sufficient torque on the fuel rod by a tightening means in engagement with a prismatic part of the fuel rod, which prismatic part is situated in the vicinity of the plug. This operation does not cause any bolts or shocks.

Moreover, the device according to the invention is particularly simple and may be easily adapted to existing control clusters by limited supplementary machining of the protective tubes and of the upper plugs of the fuel rods. The fixing of deformable metallic ferrules on the cylindrical part of the upper plug of the fuel rods is likewise a very simple operation necessitating only a few weld points.

It is possible to fix the deformable ferrule on the upper plug of the fuel rod by using a technique other than point welding and, for example, any technique of welding or of brazing which is appropriate. Likewise, it is possible to construct the ferrule by machining of the plug, by recessing its internal part over a certain height. The ferrule may be fixed on the upper plug of the fuel rod or on a part of its casing.

The prismatic surface permitting the exertion of a torque on the fuel rod may have a transverse cross-section other than a hexagonal cross-section.

The deformable ferrule may be constituted by any metal which can withstand the physical conditions prevailing in the core and simultaneously exhibiting properties of deformability ensuring a locking and a demounting of the fuel rod without exerting excessive force or excessive torque.

The invention is applicable to control clusters including demountable fuel rods for any nuclear reactor cooled with light water.

I claim:

1. Control cluster including demountable cylindrical rods comprising a crosspiece constituted by a plurality of fins disposed angularly in relation to one another and each comprising at least one protective tube having a blind bore which is internally threaded over a part of its length, an axis of said bore extending in a longitudinal direction of said control cluster, as well as a set of cylindrical rods each comprising an active part and an end part adapted to be engaged and fixed in said bore of a said protective tube and comprising, in an axial extension of a plug for closing said active part, a connecting part which is threaded over a part of its length to enable screwing of said rod into the bore of a corresponding protective tube, wherein, for each one of said demountable rods:

(a) the end part of said protective tube is open towards the exterior and comprises a reduced external diameter part over a certain length and at least one seat on a wall of said protective tube for seating said rod, and openings through its wall in said reduced diameter part;

(b) said end part of said rod is integral with a ferrule which is coaxial with said rod and which surrounds said connecting part of said rod over a portion of its length corresponding to said portion engaged in said reduced diameter part of said protective tube, said ferrule having an internal diameter substantially equal to said reduced diameter of said protective tube and being engaged on said reduced diameter part of the protective tube;

(c) a prismatic engagement surface is provided on said external surface of said rod; and (d) said rod is locked in said protective tube by deformed parts of said ferrule housed within said openings of said end part of said protective tube.

2. Control cluster according to claim 1, wherein the ferrule is welded onto the end of the rod which is close to the connecting part.

3. Control cluster according to claim 2, wherein the ferrule is point welded.

4. Control cluster according to claim 1, wherein the ferrule is welded onto the plug of the rod adjacent to the connecting part.

* * * * *